W. J. BUNYAN.
SIGNAL DEVICE FOR AUTOMOBILES.
APPLICATION FILED OCT. 12, 1917.
1,266,101.
Patented May 14, 1918.
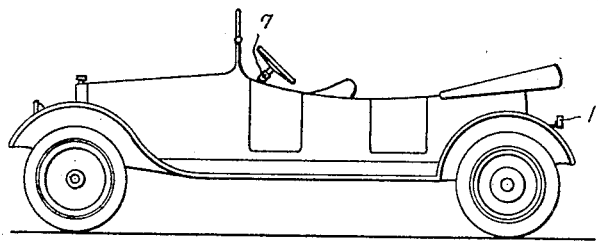
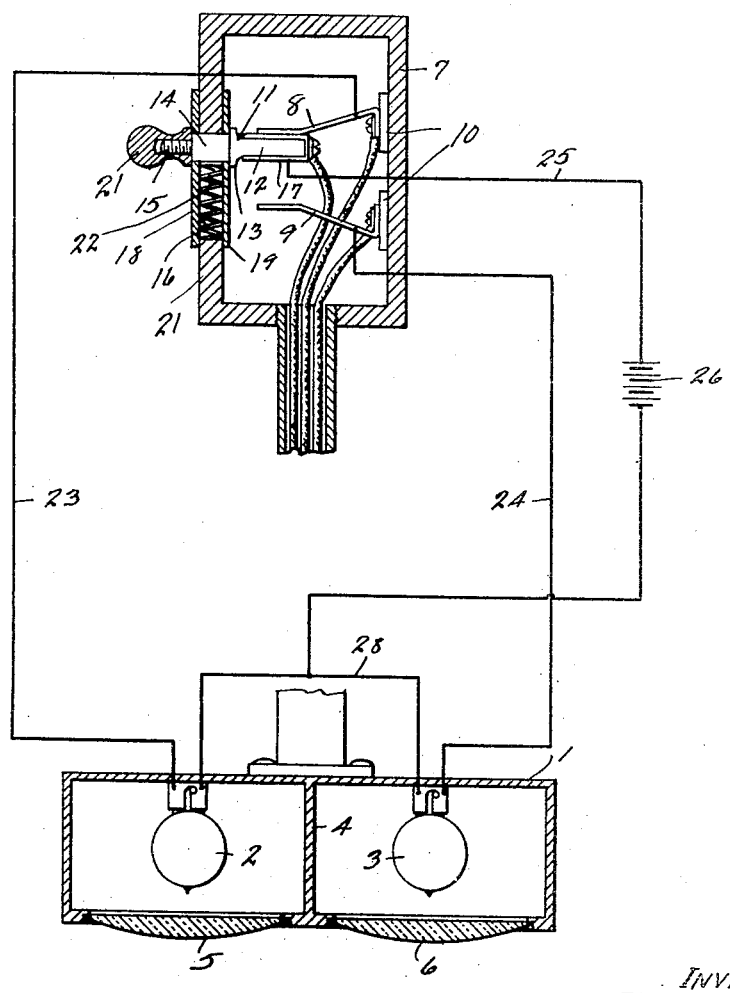
INVENTOR
W. J. BUNYAN
By John A. Brommhardt
ATTY.

UNITED STATES PATENT OFFICE.

WILLIAM J. BUNYAN, OF CLEVELAND, OHIO.

SIGNAL DEVICE FOR AUTOMOBILES.

1,266,101. Specification of Letters Patent. Patented May 14, 1918.

Application filed October 12, 1917. Serial No. 196,206.

*To all whom it may concern:*

Be it known that I, WILLIAM J. BUNYAN, a citizen of the United States, residing at Cleveland, in the county of Cuyahoga and State of Ohio, have invented certain new and useful Improvements in Signal Devices for Automobiles, of which the following is a specification.

This invention relates to signal devices for automobiles, its object being to warn the driver of a following car when a turn or stop is to be made, by changing the tail light from one color to another, as from red to blue. A red light is the common signal on the rear of an automobile. By changing this to blue, for example, the driver of a following vehicle will understand that a change of direction or speed is to be made, and the simplicity of operation is such that an indication is not apt to be misunderstood. The desired object is effected by using two tail lights, one red and the other blue, these lights being controlled by a switch which normally closes the circuit of the red light, but which can readily be operated to extinguish the red light and illuminate the blue light.

In the accompanying drawings—

Figure 1 is a side elevation of an automobile with the invention applied.

Fig. 2 is a section of the switch and tail lights, with a wiring diagram.

In the drawings, 1 indicates a casing containing the lamps 2 and 3 in compartments separated by a partition 4 and provided with a red glass 5 and a blue or other color glass 6 respectively, A switch comprises a casing 7 which is conveniently attached to the steering post beneath the steering wheel. In the casing are contact fingers 8 and 9 which rest on blocks of insulation 10. 11 is a sliding plug or switch member having a flat part 12, a shoulder 13, a squared part 14 and a threaded pin 15 to receive the knob 21. The squared part 14 of the plug works in a slot 16 in the casing, being movable up and down therein. The inner end 12 of the plug is provided with a U-shaped contact piece 17 which will contact with either the finger 8 or the finger 9. 18 and 19 are plates mounted on the squared part 14 of the plug and working against opposite faces of the front wall 21 of the casing 7. The plug member 11 is preferably made of insulating material and is held in place by the plates 18 and 19, which plates also act as covers for the slot 16 and confine therein a spring 22 under the plug. The contact piece 17 on the plug is connected in a circuit 25 with battery 26 and branch lines 28 to both lamps 2 and 3, and these lamps are respectively connected by lines 23 and 24 to the fingers 8 and 9.

Normally the spring 22 lifts the plug to contact with the finger 8, thus closing the circuit of the red lamp 2. When the driver desires to stop or turn, he presses down on the knob 21, opening the contact with the finger 8 and closing the contact with the finger 9, which opens the red light circuit, and closes the blue light circuit, thus indicating to a driver behind that he intends stopping or making a turn. When the knob is released the spring 22 shifts the plug to original position, thereby restoring the red light signal.

The device may be cheaply constructed and readily applied to motor vehicles and will indicate in an easily understood manner intended changes in speed or direction.

I claim:

A switch comprising a casing having opposite terminals therein and a slot in the wall thereof, a pin slidable laterally in said slot and provided with a contact adapted to close with either terminal, a spring in the slot, pressing against the pin and holding the contact closed with one terminal, and a pair of plates mounted on the pin at opposite sides of said wall to cover the slot and confine the spring therein.

In testimony whereof, I do affix my signature in presence of two witnesses.

WILLIAM J. BUNYAN.

Witnesses:
JOHN A. BOMMHARDT,
G. W. ROSENBERG.

Copies of this patent may be obtained for five cents each, by addressing the "Commissioner of Patents, Washington, D. C."